J. B. BEAM.
AUTOMOBILE RADIATOR.
APPLICATION FILED JULY 30, 1917.

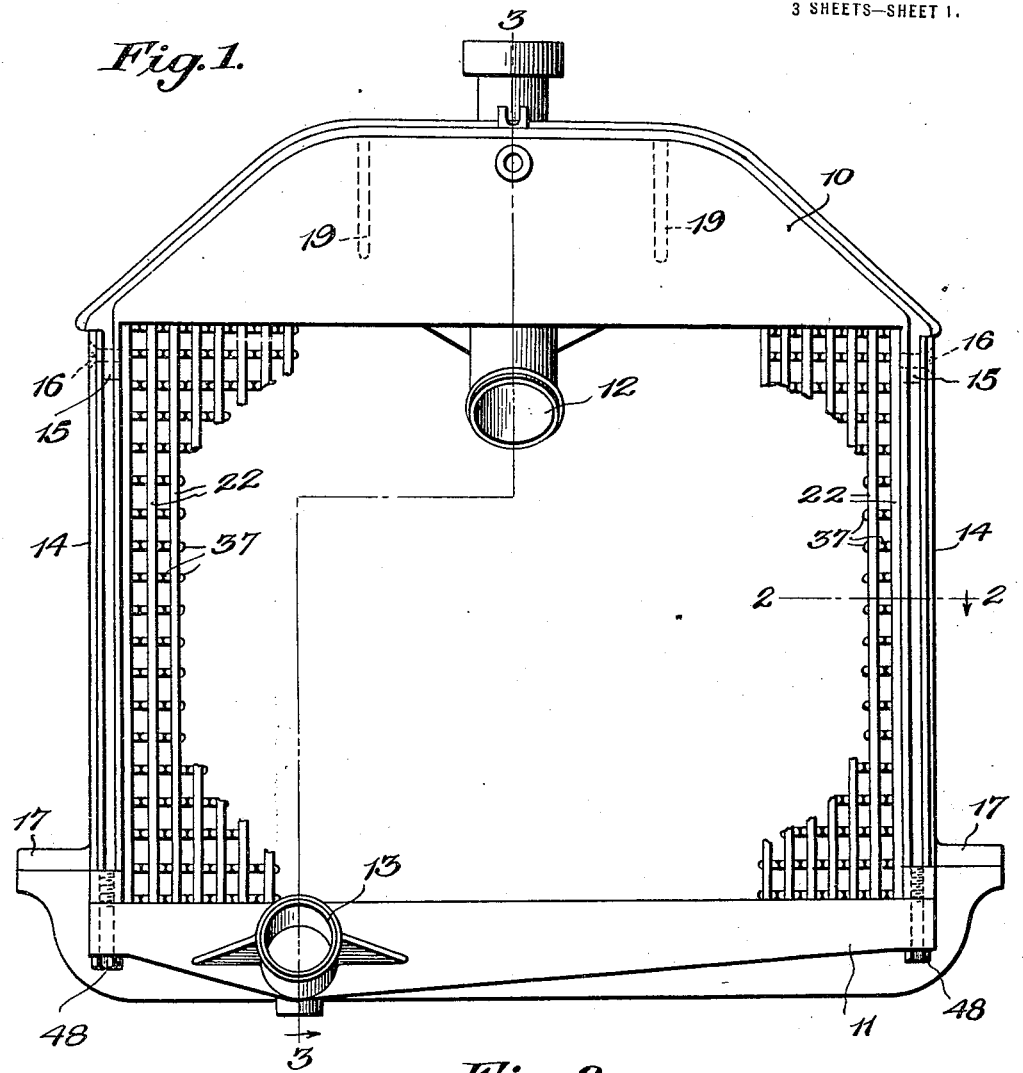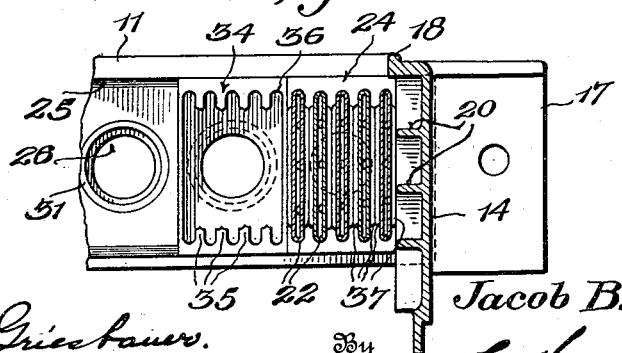

1,409,272.

Patented Mar. 14, 1922.
3 SHEETS—SHEET 2.

Inventor
Jacob B. Beam,

Witness
Chas. L. Grieshauer

By
Attorney

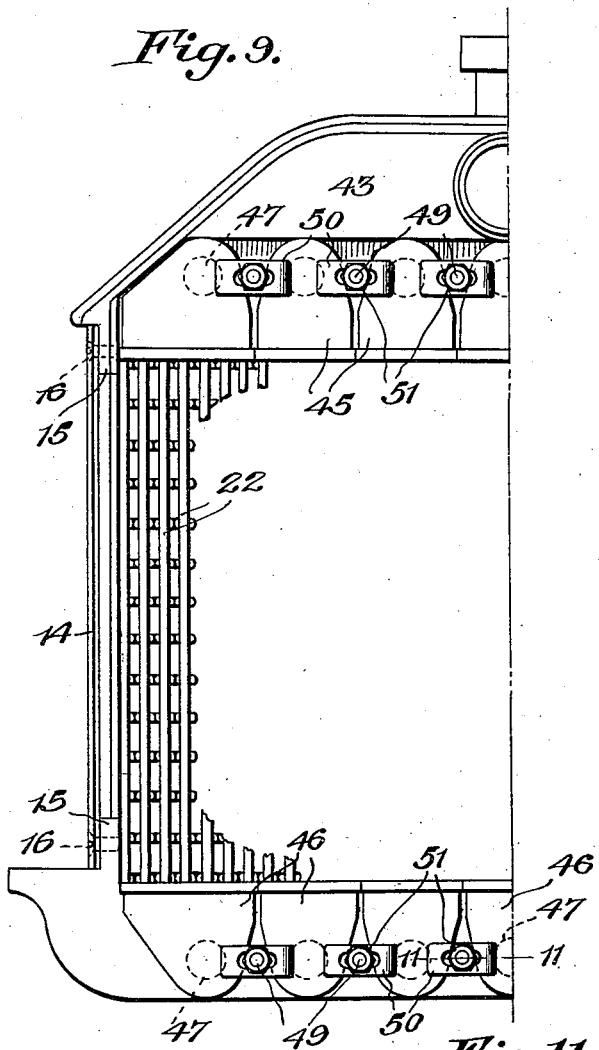
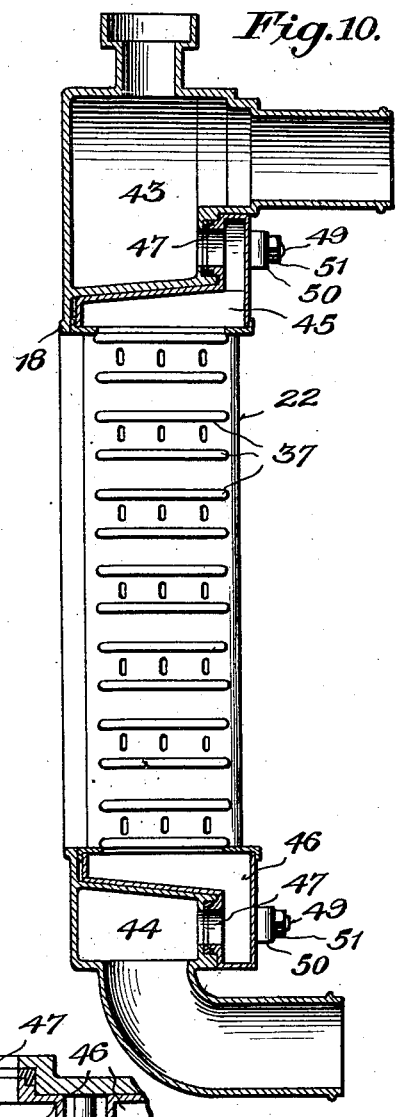
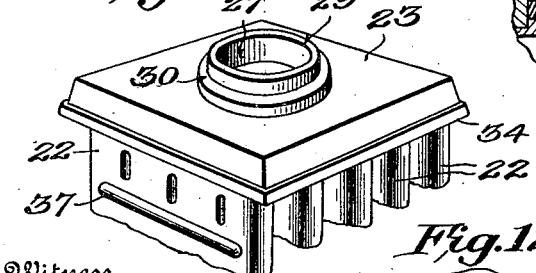
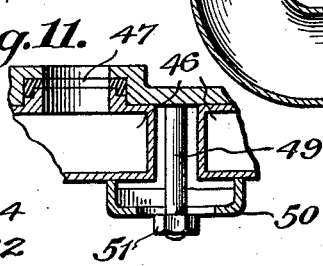
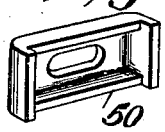

UNITED STATES PATENT OFFICE.

JACOB B. BEAM, OF PUNXSUTAWNEY, PENNSYLVANIA.

AUTOMOBILE RADIATOR.

1,409,272.  Specification of Letters Patent.  Patented Mar. 14, 1922.

Application filed July 30, 1917. Serial No. 183,552.

*To all whom it may concern:*

Be it known that I, JACOB B. BEAM, a citizen of the United States, residing at Punxsutawney, in the county of Jefferson and State of Pennsylvania, have invented certain new and useful Improvements in Automobile Radiators, of which the following is a specification.

This invention relates to radiators for use in connection with motor vehicles for the purpose of cooling the water which circulates in the cylinders of the engines and is an improvement on Patents #1,019,122, #1,026,895 and #1,026,896, granted to me March 5, 1912, and May 21, 1912, respectively.

The primary object of the invention is to provide a cast radiator casing which is formed in separate sections in order to obtain lightness of construction and to provide ease of assembling, the casing containing upper and lower chambers which communicate with tubes of a construction set forth in the above mentioned patents.

Another object of the invention is to provide novel means of forming the upper and lower water chambers within the radiator casing, which are in communication with water headers carried by the independent tube sections and are arranged in interlocking engagement therewith by a novel form of joint and washer, so that an absolutely tight joint is obtained between the chambers and the headers.

The invention further resides in the novel manner of securing and positioning the independent tube sections within the casing, so as to permit of the removal of one or more sections from the rear of the casing without disassembling the radiator, means being provided for closing the openings in the water tight chambers in order to permit of the further use of the radiator after certain of said sections have been removed.

The invention therefore consists of the following novel combination and arrangement of parts, which will be hereinafter more fully described, illustrated in the accompanying drawings and pointed out in the claim hereto appended.

In the drawings,

Figure 1 is a rear elevation of a radiator constructed in accordance with the present invention;

Figure 2 is a fragmentary sectional view taken on the line 2—2 of Figure 1;

Figure 8 is a detail perspective of one portion of one of the independent tube sections;

Figure 9 is a partial rear elevation of a modified form of the cast casing;

Figure 10 is a central sectional view of the same;

Figure 11 is a sectional view on the line 11—11 of Figure 9; and

Figure 12 is a detail perspective view of one of the spanners.

Figure 3:
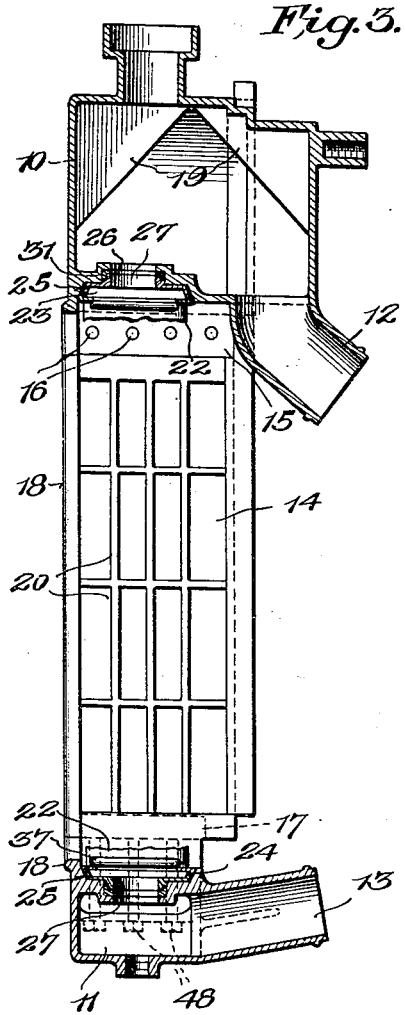
Figure 3 is a vertical sectional view on the line 3—3 of Figure 1.

In the usual construction of radiators, the radiator proper is ordinarily made of a single casting, which contains the upper and lower water headers connected together by the water circulating tubes. In this form of radiator, it is necessary to make the casting of considerable thickness in order to secure strength and to prevent damage to the casting when the central core which forms the space occupied by the water circulating tubes is removed. In order to present a neat and attractive appearance it is necessary to use in connection with this casting a cover or casing, thereby adding to the cost of manufacture and increasing the amount of material necessary to construct the radiator.

In order to overcome these and other disadvantages, the present invention contemplates the provision of a casing cast in separate sections, so that the use of the above mentioned central core is dispensed with and the casing may be made of a lighter casting. As shown in the accompanying drawings, the radiator includes an upper casting 10 and a lower casting 11, which are hollow and provide upper and lower water chambers, the former being equipped with a water inlet 12 and the latter with an outlet 13, both of which are connected to the water circulating system of the motor in the usual manner. The sections 10 and 11 are connected together by a side section 14, the upper ends of which are secured to inset lugs 15 formed on the section 10 by means of screws 16 or analogous devices. The lower ends of the side sections 14 are formed with laterally extending flanges 17, which are adapted to be secured to the machine frame in the usual manner. The castings are provided with a finishing bead 18 upon their front faces, so that it is not necessary to employ an additional cover for the radiator. In order to insure strength in addition to lightness of construction, the upper section 10 is formed with strengthening ribs 19, while the side sections 15 are provided with strengthening ribs 20.

Figure 5:
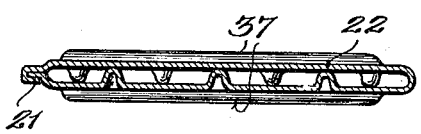
Figure 5 is a cross-section through one of the water tubes.
Figure 6:
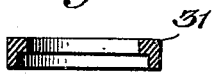
Figure 6 is a detail of the form of gasket employed in the connection shown in Figures 3 and 4.

The water circulating tubes which are similar in construction to those shown in the previously mentioned patents are formed of a single piece of sheet metal, bent in cross-sectional shape shown in Figure 5 and secured together by a seam 21. The tubes which are indicated at 22 are arranged in independent sections, these sections being composed of a plurality of tubes drawn together at each end by headers 23 and 24, the former being adapted to communicate with the upper water chamber 10 and the latter with the lower water chamber 11. For this purpose these water chambers are formed with inset portions 25 for the purpose of receiving these headers, the chambers being also formed with a plurality of spaced openings 26, one of which is adapted to communicate with each of the headers 23 and 24 through openings 27 provided in these headers.

It is a purpose of the invention to provide an interlocking water tight joint between the independent tube sections and the upper and lower headers, without the use of solder and this is accomplished by forming the openings 26 with concentrically arranged seats 28, within which the flanges 29 formed around the openings 27 are adapted to enter, the said flanges being shouldered as shown at 30.

Figure 4:
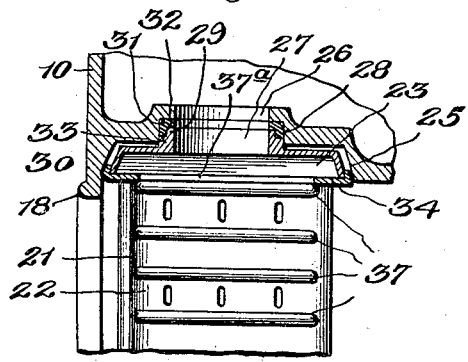
Figure 4 is an enlarged fragmentary section of a connection between the upper water chamber and header.

Between these flanges in the seat 28 is a washer 31, of L-shape in cross-section, so that when the independent tube sections are positioned within the casing, a double interlocking joint will be formed by means of this washer at the points indicated at 32 and 33, this method of connection serving to center the sections within the casing, leaving the other portions of the headers 23 free of contact, as shown in Figure 4 of the drawings.

Both the upper and lower headers, which are included in these independent tube sections, are formed of stamped metal and are stamped into an open box-like formation having inclined sides to facilitate the insertion and removal of the sections. The headers are closed by means of a separately stamped plate 34, which, as shown in Figure 2, is of hollow rectangular formation and is provided with inwardly extending spacing fingers 35. The spaces between these fingers provide seats 26, which are adapted to receive the tubes 22, the transverse side flanges 37 which are formed on these tubes abutting one another. The extreme upper and lower portions 37ª are of just sufficient length to overlap the inwardly extending ends of the fingers 35 and form a closure for the spaces between these fingers. After the independent tube sections are assembled within the headers, the same are "dipped" in the usual manner, so that an absolutely water tight joint is obtained between all of the parts of the sections.

Figure 7:
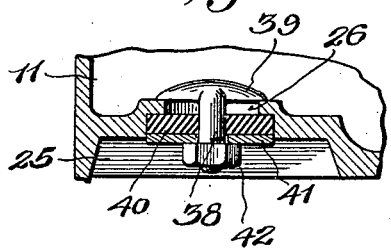
Figure 7 illustrates the method of closing the opening in the water chamber after the removal of an independent tube section.

By constructing the water tubes in independent sections, should they become damaged or leak and in order to provide for the use of the radiator after one or more of these sections have been removed, there is provided a closure for any of the openings 26, which may be readily secured within these openings to prevent leakage or escape of water from either of the water chambers. This closure comprises a bolt 38, which is formed with a T-head 39, which is adapted to engage the surrounding edges of the opening 26 as shown in Figure 7 of the drawings. This bolt is adapted to receive a gasket 40, which is of a size to fit within the seat 28 and is held therein by means of the disk 41, and is secured at 42. One of the projecting portions of the T-head 39 of the bolt is slightly shorter than the other section to aid in positioning the bolt within the opening.

The modification shown in Figures 9 and 10 of the drawings includes upper and lower water chambers 43 and 44, respectively, which are adapted to communicate with headers 45 and 46 carried by the independent tube sections, the difference of construction being that instead of these headers having communication with the bottom of the upper chamber and the top of the lower chamber, in the present form, the headers communicate with each of these chambers at the rear thereof as shown at 47, the joint at this point of communication being similar to the one previously described in the first mentioned form.

This provides for the difference of assembling the radiator. In the construction first described, the side sections 14 are secured to the upper casting 10 through the medium of the screws 16 previously mentioned, the independent tube sections then being positioned within the seat 25 of the upper section and the lower section 11 placed in position at the bottom of these tube sections. The casing is then secured together by means of the bolts 48, which draw the upper and lower sections of the casing together and position the headers 23 and 24 for communication with their respective water chambers.

In assembling the radiator shown in Figures 9 and 10, the top, bottom and side sections of the radiator are assembled and the independent tube sections secured within the opening formed by these sections through the medium of securing bolts 49, which are engaged within openings provided in the rear walls of the upper and lower chambers 43 and 44. The headers 45 and 46 are substantially L-shaped as shown in Figure 10, the vertical leg of the L being positioned behind the water chambers and bolts 49 passing between the adjacent headers as shown in Figure 9. These bolts receive spanners 50, which are adapted to break the space between the adjacent headers and engage over the side edges of the same and are held in position by means of nuts 51.

It will be seen that any one of the independent tube sections may be removed by loosening the bolts and turning the spanners 51, the openings in the chambers being closed by a previously described means.

It is believed that from the foregoing description, when taken in connection with the accompanying drawings, that the construction, operation and advantages of the invention will be apparent. The right is reserved to make such changes in the form and proportion of the invention as will fall within the scope of the appended claim.

Having described the invention, what is claimed is:

A radiator embodying a casing and comprising a removable upper water chamber, a removable lower water chamber and side sections connecting said chambers, removable tube sections connecting the upper and lower water chambers including a plurality of water circulating tubes, upper and lower headers in each section which have openings which register with openings in the respective lower and upper walls of the upper and lower water chambers, a seat having inclined walls surrounding the openings of the water chambers the water headers of the tube sections having inclined walls, to facilitate the positioning of the sections.

In testimony whereof I affix my signature.

JACOB B. BEAM.

Witnesses:
  ELIZABETH WINTER,
  RUTH WILLIAMSON.